United States Patent
Dai et al.

(10) Patent No.: US 8,526,172 B2
(45) Date of Patent: Sep. 3, 2013

(54) HINGE DEVICE AND KEYBOARD DOCK AND PORTABLE ELECTRONIC DEVICE HAVING THE SAME

(75) Inventors: Hish-Bin Dai, New Taipei (TW);
Yi-Ling Kuo, New Taipei (TW);
Ming-Hua Hung, New Taipei (TW);
Wen-Chin Wu, New Taipei (TW);
Chih-Kuang Chuang, New Taipei (TW)

(73) Assignees: Wistron Corporation, New Taipei (TW); Shin Zu Shing Co., Ltd., New Taipei (TW)

( * ) Notice: Subject to any disclaimer, the term of this patent is extended or adjusted under 35 U.S.C. 154(b) by 179 days.

(21) Appl. No.: 13/174,797

(22) Filed: Jul. 1, 2011

(65) Prior Publication Data

US 2012/0293938 A1 Nov. 22, 2012

(30) Foreign Application Priority Data

May 20, 2011 (TW) ............................... 100117779 A (51) Int. Cl.
*H05K 5/02* (2006.01)
(52) U.S. Cl.
USPC ............ 361/679.07; 361/679.09; 361/679.17; 361/679.41; 16/366; 16/371; 16/302
(58) Field of Classification Search
USPC .............. 361/679.01, 679.02, 679.08, 679.09, 361/679.17; 16/221, 371, 366, 367, 277, 16/302, 303, 304, 305, 306, 307, 308, 329, 16/330, 343, 349, 350
See application file for complete search history.

(56) References Cited

U.S. PATENT DOCUMENTS

| | | | | |
|---|---|---|---|---|
| 5,911,763 | A * | 6/1999 | Quesada | 70/120 |
| 6,700,775 | B1 * | 3/2004 | Chuang et al. | 361/679.01 |
| 7,551,426 | B2 | 6/2009 | Huang et al. | |
| 7,652,873 | B2 * | 1/2010 | Lee | 361/679.06 |
| 7,797,797 | B2 * | 9/2010 | Chiang et al. | 16/367 |
| 2006/0005354 | A1 * | 1/2006 | Nada et al. | 16/221 |
| 2007/0195495 | A1 * | 8/2007 | Kim et al. | 361/681 |
| 2007/0287307 | A1 | 12/2007 | Park | |
| 2008/0232048 | A1 | 9/2008 | Yamamoto et al. | |

FOREIGN PATENT DOCUMENTS

| | | |
|---|---|---|
| TW | 545858 | 8/2003 |
| TW | 200806866 | 2/2008 |

* cited by examiner

*Primary Examiner* — Hoa C Nguyen
*Assistant Examiner* — Amol Patel
(74) *Attorney, Agent, or Firm* — Jianq Chyun IP Office (57) ABSTRACT

A hinge device and a keyboard dock and a portable electronic device having the same are provided. The hinge device includes a body, a torsion generating part, a rotating part and a second wedging unit. The torsion generating part is pivotally connected to the body and has a first wedging unit. The rotating part is pivotally connected to the body. The second wedging unit is assembled to the rotating part and moved along with the rotating part. The first wedging unit and the second wedging unit are wedged together or separated from each other while the rotating part rotates relative to the body along a first axis. The body can rotate along a second axis relative to the torsion generating part while the first wedging unit and the second wedging unit are separated from each other. The first axis is vertical to the second axis.

18 Claims, 12 Drawing Sheets

HINGE DEVICE AND KEYBOARD DOCK AND PORTABLE ELECTRONIC DEVICE HAVING THE SAME

CROSS-REFERENCE TO RELATED APPLICATION

This application claims the priority benefit of Taiwan application serial no. 100117779, filed May 20, 2011. The entirety of the above-mentioned patent application is hereby incorporated by reference herein and made a part of this specification.

BACKGROUND OF THE INVENTION

1. Field of the Invention

The invention relates to a hinge device and a keyboard dock and a portable electronic device having the same. Particularly, the invention relates to a hinge device capable of achieving rotation and opening/closing effects and a keyboard dock and a portable electronic device having the same.

2. Description of Related Art

Control information is input to a conventional flat panel computer through a touch screen. However, operation convenience of the touch screen does not satisfy all of the user's demands, so that a related external keyboard is developed accordingly. The conventional external keyboard includes a base having a keyboard module and a supporting mechanism disposed on the base. In the conventional external keyboard, the supporting mechanism capable of pivoting relative to the base is used to carry the flat panel computer, for example, Taiwan Patent No. 545858 and Taiwan Patent No. 1295705. However, the operation process of the above external keyboard is complicated and carrying stability of a used hinge device is poor. Moreover, the keyboard module of the conventional external keyboard is directly exposed to external, which is liable to be damaged due to pollution of dust and moisture, etc. Therefore, it is an important issue of the computer industry to provide a hinge device with good carrying stability and improve operation convenience of the external keyboard and the portable electronic device.

SUMMARY OF THE INVENTION

The invention is directed to a hinge device, which is capable of providing stable and fluent rotation and opening/closing operations.

The invention is directed to a keyboard dock, which has stable and fluent rotation and opening/closing operations.

The invention is directed to a portable electronic device, which has stable and fluent rotation and opening/closing operations.

The invention provides a hinge device including a body, a torsion generating part, a rotating part and a second wedging unit. The torsion generating part is pivotally connected to the body and has a first wedging unit. The rotating part is pivotally connected to the body. The second wedging unit is assembled to the rotating part and is moved along with the rotating part. The first wedging unit and the second wedging unit are wedged to each other or separated from each other when the rotating part rotates relative to the body along a first axis. The body is capable of rotating relative to the torsion generating part along a second axis when the first wedging unit and the second wedging unit are separated from each other. The first axis is vertical to the second axis.

In an embodiment of the invention, the hinge device further includes a torsion spring disposed between the body and the torsion generating part. When the first wedging unit and the second wedging unit are separated from each other, the torsion spring drives the body to rotate relative to the torsion generating part.

In an embodiment of the invention, the first wedging unit is a wedging hole. The second wedging unit includes a rotating disk and at least one linkage lever connected to each other. The rotating disk is assembled to the rotating part and is rotated along with the rotating part. The rotating disk drives the linkage lever to pass through the first wedging unit or separate from the first wedging unit when the rotating part and the rotating disk synchronously rotate relatively to the body. Moreover, the hinge device further includes a shaft lever sequentially penetrating through the rotating disk, the body and the rotating part. The shaft lever drives the rotating disk and the rotating part to synchronously rotate, and the body is not rotated along with the shaft lever. Moreover, the hinge device further includes a locating plate. The shaft lever sequentially penetrates through the rotating disk, the body, the locating plate and the rotating part. The shaft lever drives the rotating disk, the locating plate and the rotating part to synchronously rotate. The locating plate has at least one locating protrusion at a side adjacent to the body. The body has at least one locating slot at a side adjacent to the locating plate. The locating protrusion is suitable for engaging the locating slot to limit relative rotation of the rotating part and the body. Moreover, the hinge device further includes a fixing lever. A groove is set on the rotating disk. One end of the fixing lever is pivotally connected to the body, and another end of the fixing lever is wedged into the groove to limit rotation of the rotating disk when the linkage lever is separated from the first wedging unit.

In an embodiment of the invention, the body has a rotation shaft. One side of the torsion generating part is curled to embrace the rotation shaft to generate a desired torque.

The invention provides a keyboard dock including a base, a supporting plate and a hinge device. The base has a keyboard module. The supporting plate is used for supporting a portable computer. The hinge device includes a body, a torsion generating part, a rotating part and a second wedging unit. The torsion generating part is pivotally connected to the body and is fixed to the base, and the torsion generating part has a first wedging unit. The rotating part is pivotally connected to the body and is fixed to the supporting plate. The second wedging unit is assembled to the rotating part and is moved along with the rotating part. The first wedging unit and the second wedging unit are wedged to each other or separated from each other when the rotating part rotates relative to the body along a first axis. The base is parallel to the supporting plate when the first wedging unit and the second wedging unit are wedged to each other. The body is capable of rotating relative to the torsion generating part along a second axis when the first wedging unit and the second wedging unit are separated from each other. The first axis is vertical to the second axis.

In an embodiment of the invention, the hinge device further includes a torsion spring disposed between the body and the torsion generating part. When the first wedging unit and the second wedging unit are separated from each other, the torsion spring drives the body to rotate relative to the torsion generating part.

In an embodiment of the invention, the first wedging unit is a wedging hole. The second wedging unit includes a rotating disk and at least one linkage lever connected to each other. The rotating disk is assembled to the rotating part and is rotated along with the rotating part. The rotating disk drives the linkage lever to pass through the first wedging unit or separate from the first wedging unit when the rotating part and the rotating disk synchronously rotate relatively to the body. Moreover, the hinge device further includes a shaft lever sequentially penetrating through the rotating disk, the body and the rotating part. The shaft lever drives the rotating disk and the rotating part to synchronously rotate, and the body is not rotated along with the shaft lever. Moreover, the hinge device further includes a locating plate. The shaft lever sequentially penetrates through the rotating disk, the body, the locating plate and the rotating part. The shaft lever drives the rotating disk, the locating plate and the rotating part to synchronously rotate. The locating plate has at least one locating protrusion at a side adjacent to the body. The body has at least one locating slot at a side adjacent to the locating plate. The locating protrusion is suitable for engaging the locating slot to limit relative rotation of the rotating part and the body. Moreover, the hinge device further includes a fixing lever. A groove is set on the rotating disk. One end of the fixing lever is pivotally connected to the body, and another end of the fixing lever is wedged into the groove to limit rotation of the rotating disk when the linkage lever is separated from the first wedging unit. Moreover, the keyboard dock further includes a thimble fixed to the base. When the base is parallel to the supporting plate, the thimble props the fixing lever and the other end of the fixing lever is apart from the groove. When the thimble is separated from the fixing lever, the other end of the fixing lever is wedged into the groove.

In an embodiment of the invention, the body has a rotation shaft. One side of the torsion generating part is curled to embrace the rotation shaft to generate a desired torque.

In an embodiment of the invention, the keyboard dock further includes a pin set disposed aside the keyboard module of the base and electrically connected to the keyboard module. When the supporting plate is obliquely erected on the base and exposes the keyboard module, the pin set is used to electrically connect the portable computer on the supporting plate.

The invention provides a portable electronic device including a host, a display unit and a hinge device. The display unit is electrically connected to the host. The hinge device includes a body, a torsion generating part, a rotating part and a second wedging unit. The torsion generating part is pivotally connected to the body and is fixed to the host, and the torsion generating part has a first wedging unit. The rotating part is pivotally connected to the body and is fixed to the display unit. The second wedging unit is assembled to the rotating part and is moved along with the rotating part. The first wedging unit and the second wedging unit are wedged to each other or separated from each other when the rotating part rotates relative to the body along a first axis. The host is parallel to the display unit when the first wedging unit and the second wedging unit are wedged to each other. The body is capable of rotating relative to the torsion generating part along a second axis when the first wedging unit and the second wedging unit are separated from each other. The first axis is vertical to the second axis.

In an embodiment of the invention, the hinge device further includes a torsion spring disposed between the body and the torsion generating part. When the first wedging unit and the second wedging unit are separated from each other, the torsion spring drives the body to rotate relative to the torsion generating part.

In an embodiment of the invention, the first wedging unit is a wedging hole. The second wedging unit includes a rotating disk and at least one linkage lever connected to each other. The rotating disk is assembled to the rotating part and is rotated along with the rotating part. The rotating disk drives the linkage lever to pass through the first wedging unit or separate from the first wedging unit when the rotating part and the rotating disk synchronously rotate relatively to the body. Moreover, the hinge device further includes a shaft lever sequentially penetrating through the rotating disk, the body and the rotating part. The shaft lever drives the rotating disk and the rotating part to synchronously rotate, and the body is not rotated along with the shaft lever. Moreover, the hinge device further includes a locating plate. The shaft lever sequentially penetrates through the rotating disk, the body, the locating plate and the rotating part. The shaft lever drives the rotating disk, the locating plate and the rotating part to synchronously rotate. The locating plate has at least one locating protrusion at a side adjacent to the body. The body has at least one locating slot at a side adjacent to the locating plate. The locating protrusion is suitable for engaging the locating slot to limit relative rotation of the rotating part and the body. Moreover, the hinge device further includes a fixing lever. A groove is set on the rotating disk. One end of the fixing lever is pivotally connected to the body, and another end of the fixing lever is wedged into the groove to limit rotation of the rotating disk when the linkage lever is separated from the first wedging unit. Moreover, the keyboard dock further includes a thimble fixed to the host. When the host is parallel to the display unit, the thimble props the fixing lever and the other end of the fixing lever is apart from the groove. When the thimble is separate from the fixing lever, the other end of the fixing lever is wedged into the groove.

In an embodiment of the invention, the body has a rotation shaft. One side of the torsion generating part is curled to embrace the rotation shaft to generate a desired torque.

According to the above descriptions, in the hinge device, the keyboard dock and the portable electronic device, the rotating part and the body provide the rotation along the first axis, and by controlling the wedging units in a specific state, the body and the torsion generating part provide the rotation along the second axis.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
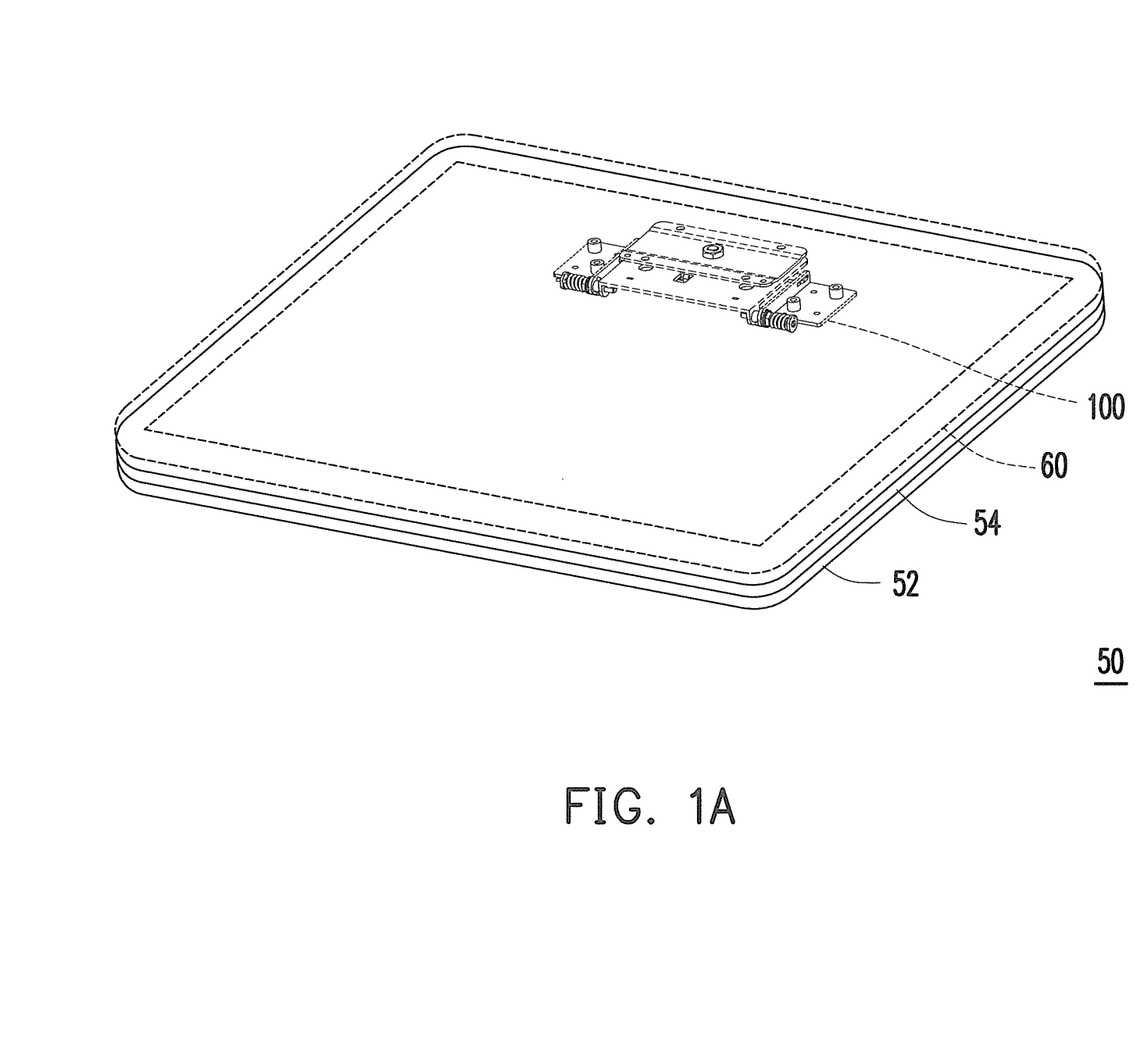
FIG. 1A is a perspective view of a keyboard dock according to an embodiment of the invention.
Figure 1B:
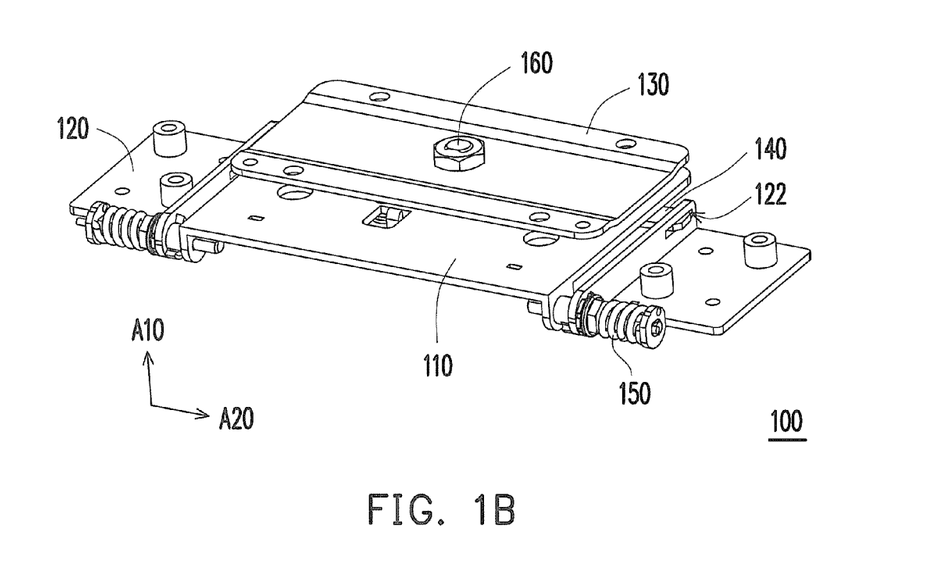
FIG. 1B is a schematic diagram of a hinge device adapted to the keyboard dock of FIG. 1A according to an embodiment of the invention.
Figure 1C:
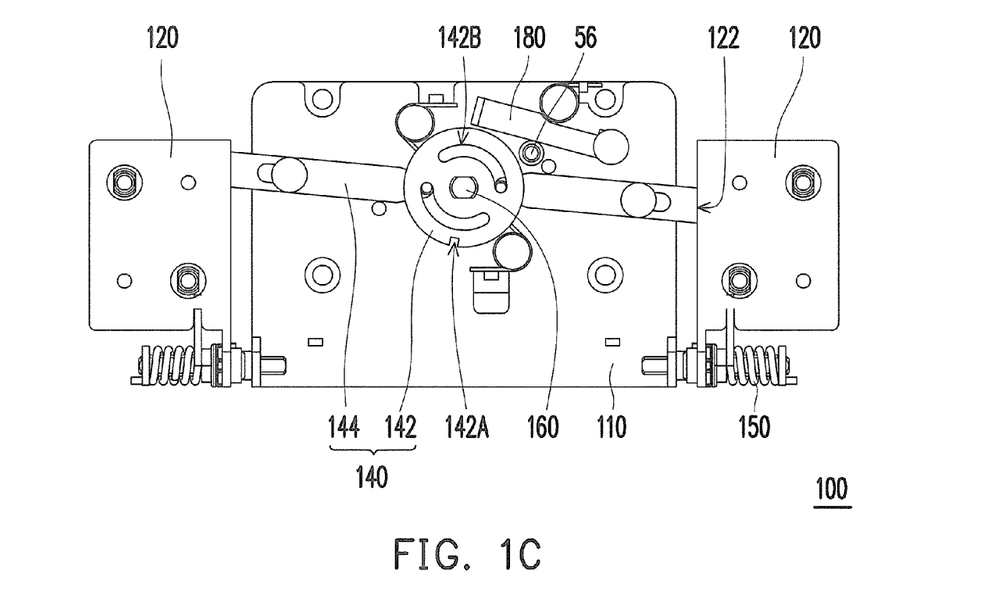
FIG. 1C is a bottom view of the hinge device of FIG. 1B.

FIG. 1A is a perspective view of a keyboard dock according to an embodiment of the invention, FIG. 1B is a schematic diagram of a hinge device adapted to the keyboard dock of FIG. 1A according to an embodiment of the invention, and FIG. 1C is a bottom view of the hinge device of FIG. 1B.

Referring to FIG. 1A to FIG. 1C, the keyboard dock 50 of the present embodiment includes a base 52, a supporting plate 54 and a hinge device 100. The supporting plate 54 is used for supporting a portable computer 60. The hinge device 100 includes a body 110, a torsion generating part 120, a rotating part 130 and a second wedging unit 140. The torsion generating part 120 is pivotally connected to the body 110 and is fixed to the base 52, i.e. the torsion generating part 120 and the base 52 can be rotated together relative to the body 110. The rotating part 130 is pivotally connected to the body 110 and is fixed to the supporting plate 54, i.e. the rotating part 130 and the supporting plate 54 can be rotated together relative to the body 110. The rotating part 130 rotates relative to the body 110 along a first axis A10, and the torsion generating part 120 rotates relative to the body 110 along a second axis A20, where the first axis A10 is vertical to the second axis A20. In the present embodiment, two torsion generating parts 120 are taken as an example for description, though the number of the torsion generating part 120 can also be one.

Figure 2A:
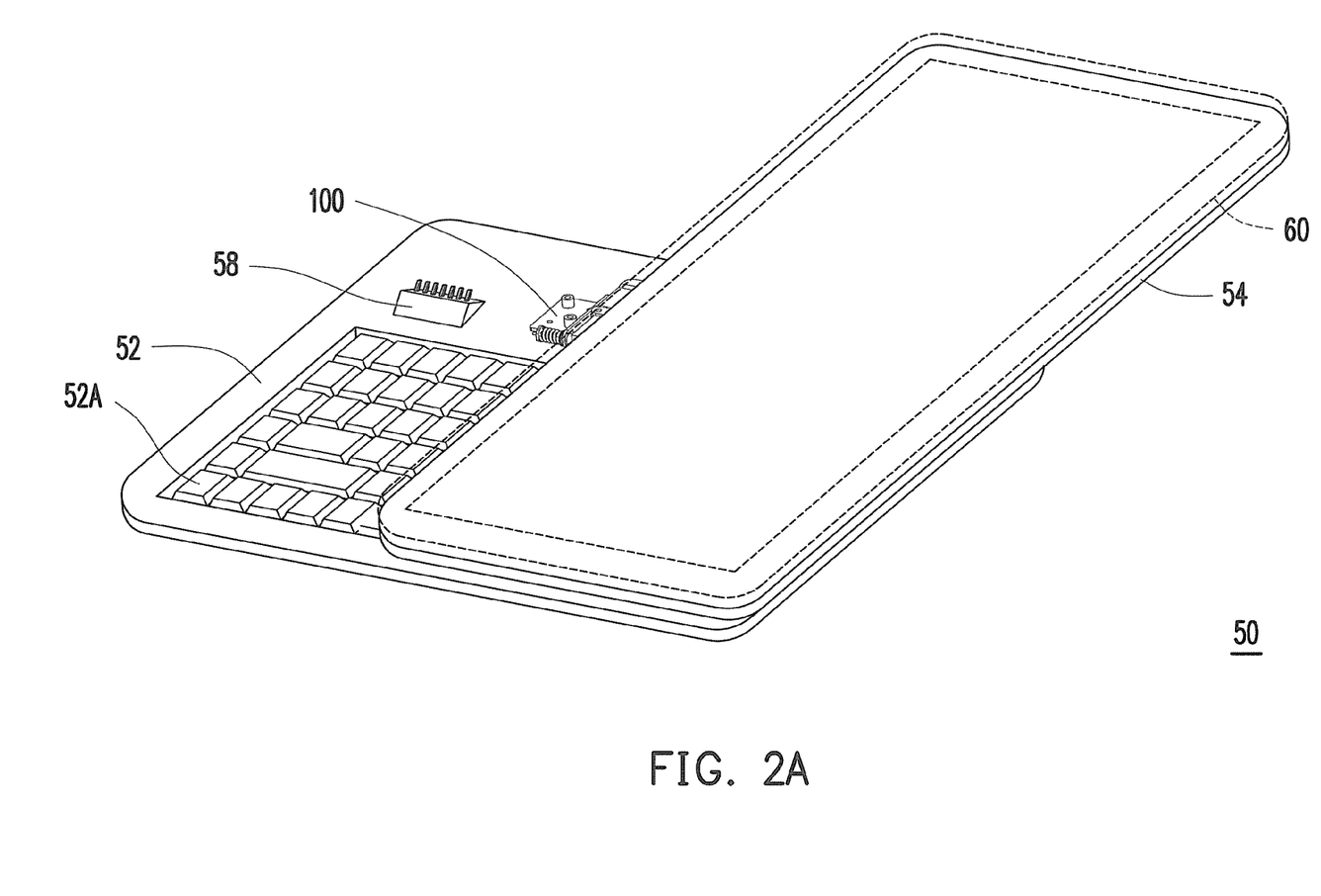
FIG. 2A, FIG. 3A and FIG. 4A are respectively perspective views of the keyboard dock of FIG. 1A in three other states.
Figure 3A:
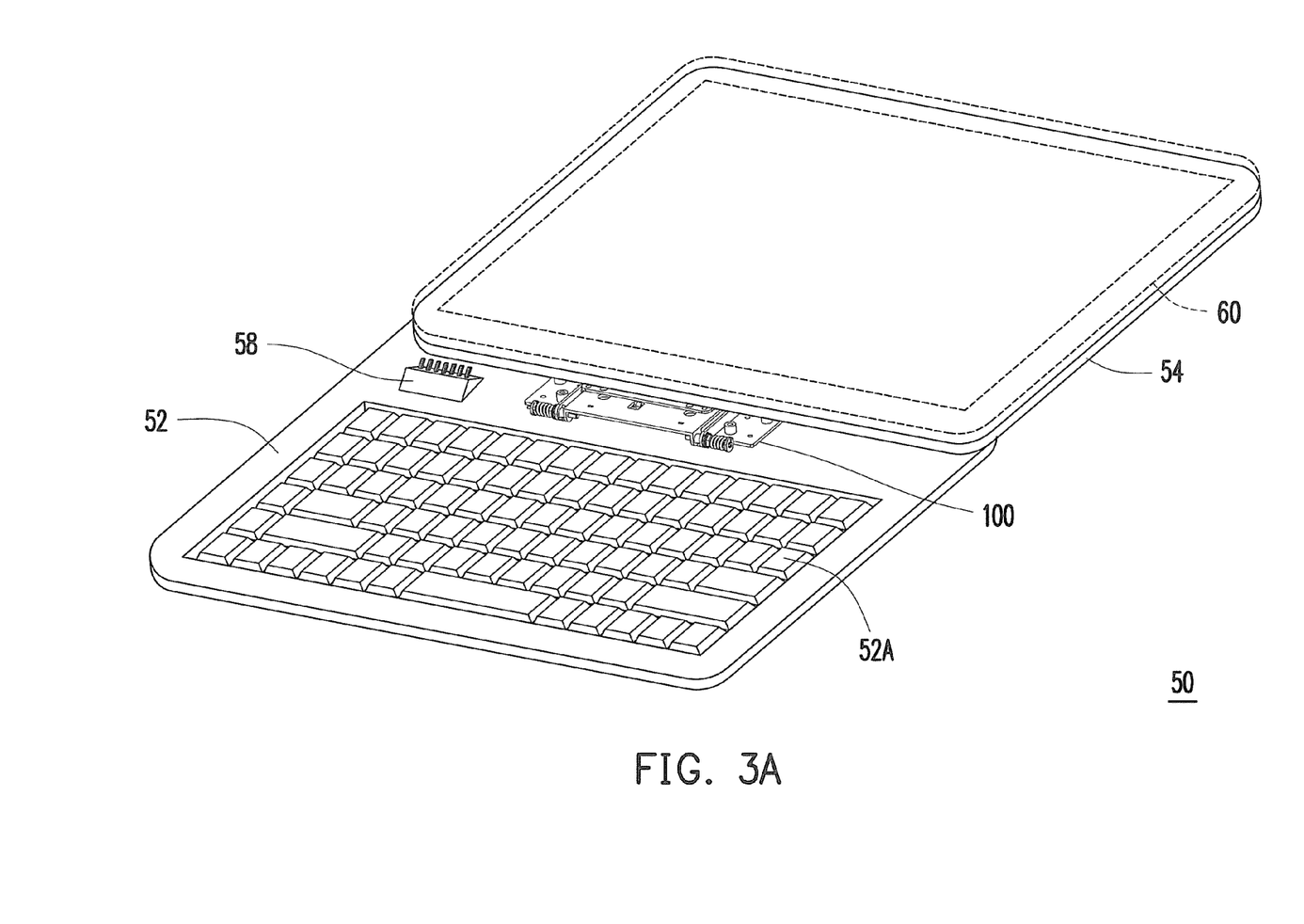
Figure 4A:
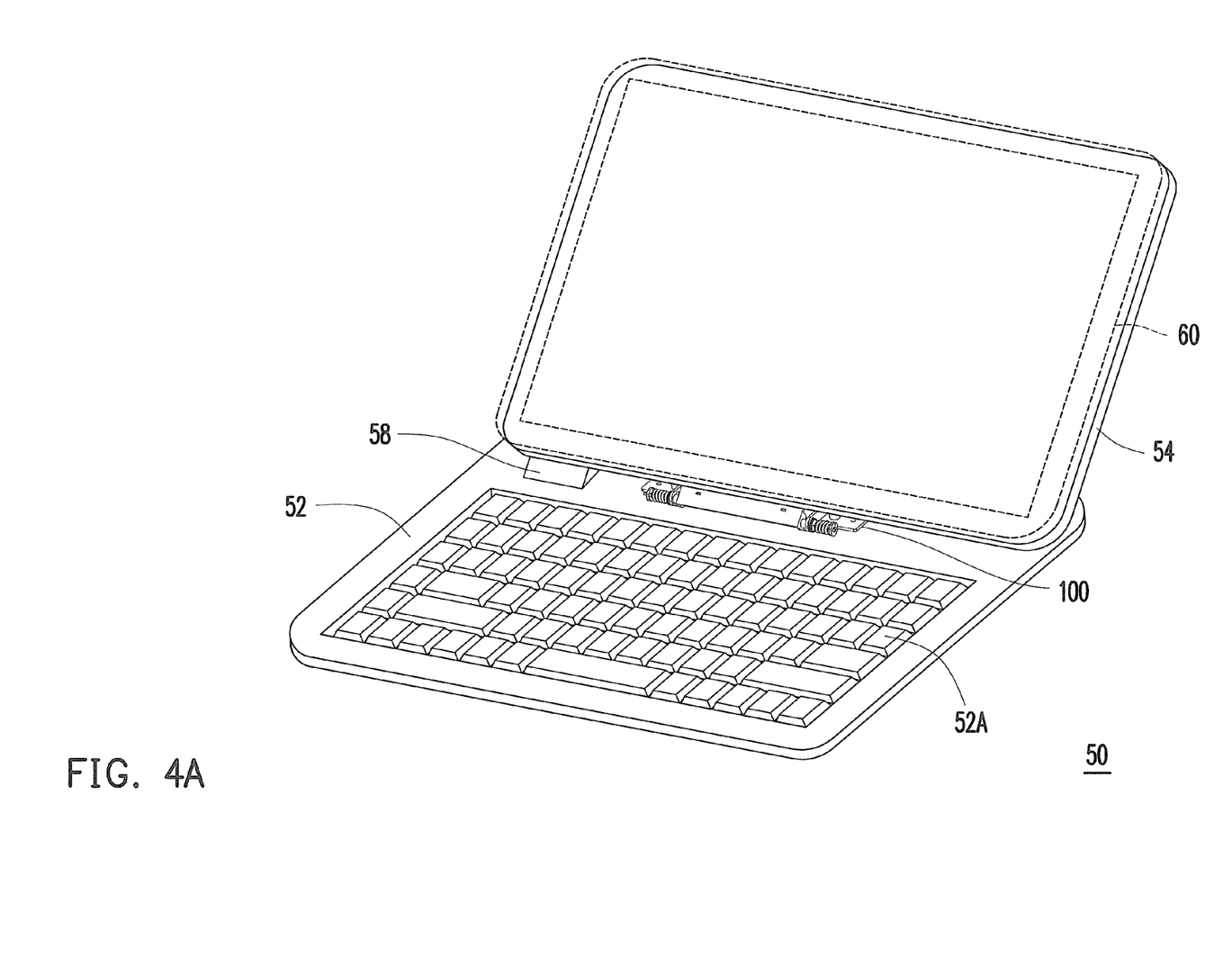

The base 52 and the supporting plate 54 can be rotated related to each other in a parallel state (shown in FIG. 2A and FIG. 3A) through the hinge device 100. Meanwhile, after the supporting plate 54 is rotated relative to the base 52 to expose a keyboard module 52A on the base 52 (as that shown in FIG. 3A), the supporting plat 54 can be flipped over from the base 52 and obliquely erected on the base 52 (as that shown in FIG. 4A), and under such state, the portable computer 60 can be disposed on the supporting plate 54 to facilitate the user viewing images displayed by the portable computer 60 from a comfortable viewing angle. Moreover, the keyboard module 52A and the portable computer 60 can be connected through a cable or wireless approach, and the user can input signals to the portable computer 60 through the keyboard module 52A to control the portable computer 60.

The torsion generating part 120 has a first wedging unit 122. The second wedging unit 140 is assembled to the rotating part 130 and is moved along with the rotating part 130. Therefore, when the rotating part 130 rotates relative to the body 110 along the first axis A10, the first wedging unit 122 and the second wedging unit 140 are wedged to each other or separated from each other according to rotation angle variations. For example, the rotating part 130 rotates relative to the body 110 from a state shown in FIG. 1B to a state shown in FIG. 2B, during the above rotating process, the first wedging unit 122 and the second wedging unit 140 are all wedged to each other. Therefore, the body 110 and the tension generating part 120 cannot be rotated relative to each other, so that the base 52 is maintained to be parallel to the supporting plate 54.

Figure 2B:
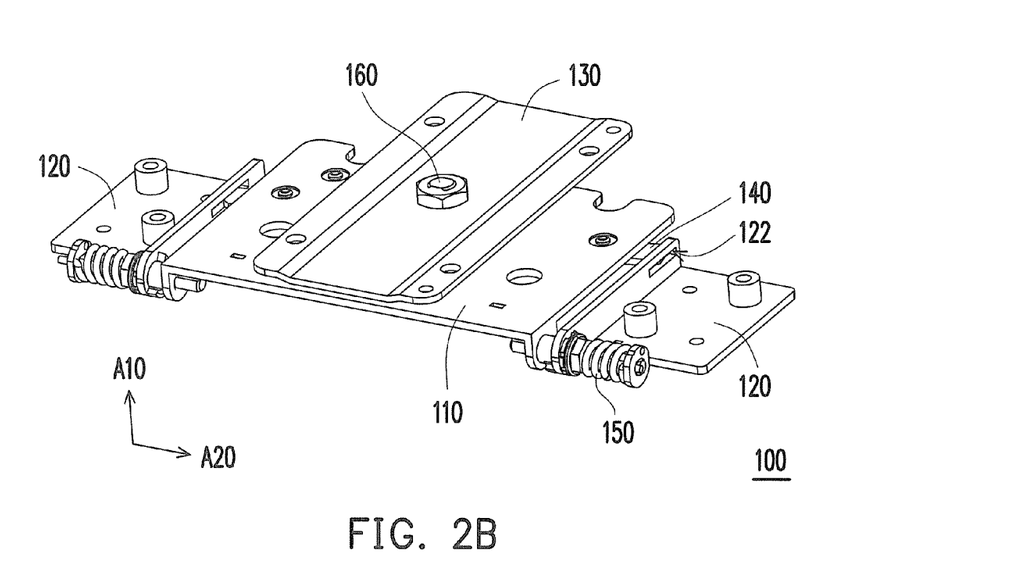
FIG. 2B is a schematic diagram of a hinge device of a keyboard dock in the state of FIG. 2A.
Figure 3B:
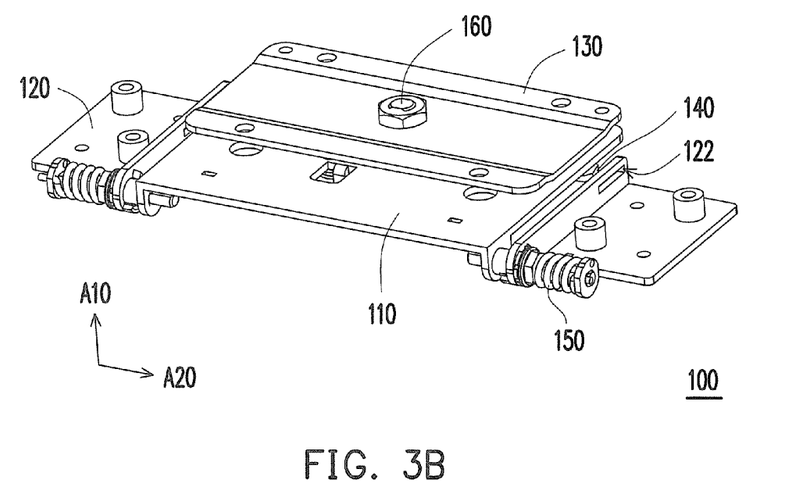
FIG. 3B is a schematic diagram of a hinge device of a keyboard dock in the state of FIG. 3A.

Then, when the rotating part 130 rotates relative to the body 110 from the state shown in FIG. 2B to a state shown in FIG. 3B, the first wedging unit 122 and the second wedging unit 140 are gradually separated from each other, and the supporting plate 54 exposes the entire keyboard module 52A on the base 52, and now the body 110 can rotate relative to the torsion generating part 120 along the second axis A20. That is to say, the supporting plate 54 can be flipped over from the base 52 and obliquely erected on the base 52 (shown in FIG. 4A).

According to the above descriptions, it is known that when the keyboard dock 50 applies the hinge device 100, due to the interaction of the first wedging unit 122 and the second wedging unit 140, before the keyboard module 52A is fully exposed, the supporting plate 54 and the base 52 are limited to be rotated in the mutually parallel state. Moreover, after the keyboard module 52A is fully exposed, the supporting plate 54 is allowed to be flipped over from the base 52, so as to avoid improper impact between the supporting plate 54 and the keyboard module 52A.

The keyboard dock 50 of the present embodiment further includes a pin set 58 disposed aside the keyboard module 52A of the base 52 and electrically connected to the keyboard module 52A. The pin set 58 can be a pogo pin set. When the supporting plate 54 is obliquely erected on the base 52 and exposes the keyboard module 52A (as that shown in FIG. 4A), the pin set 58 is used to electrically connect the portable computer 60 on the supporting plate 54. In other words, the signals input through the keyboard module 52A by the user can be transmitted to the portable computer 60 through the pin set 58. Moreover, the pin set 58 may have a magnet (not shown), which is used to magnetically attract the portable computer 60 on the supporting plate 54 under the state shown in FIG. 4A. A corresponding magnet (not shown) can also be disposed on the portable computer 60 to strengthen a bonding strength between the pin set 58 and the portable computer 60.

Referring to FIG. 1B and FIG. 1C, the first wedging unit 122 of the present embodiment is a wedging hole. The second wedging unit 140 includes a rotating disk 142 and at least one linkage lever 144 connected to each other, and in the present embodiment, two linkage levers 144 are taken as an example for description. In detail, one end of the linkage lever 144 is movably disposed in a slide track 142B of the rotating disk 142, so that when the rotating disk 142 is rotated, one end of the linkage lever 144 is driven by the slide track 142B to change a length that the linkage lever 144 passes through the first wedging unit 122, and even separate the linkage lever 144 from the first wedging unit 122 (as that shown in FIG. 3C). The rotating disk 142 is assembled to the rotating part 130 and is synchronously rotated along with the rotating part 130. When the rotating part 130 and the rotating disk 142 synchronously rotate related to the body 110, the rotating disk 142 drives the linkage lever 144 to pass through the first wedging unit 122 or separate from the first wedging unit 122.

Figure 5A:
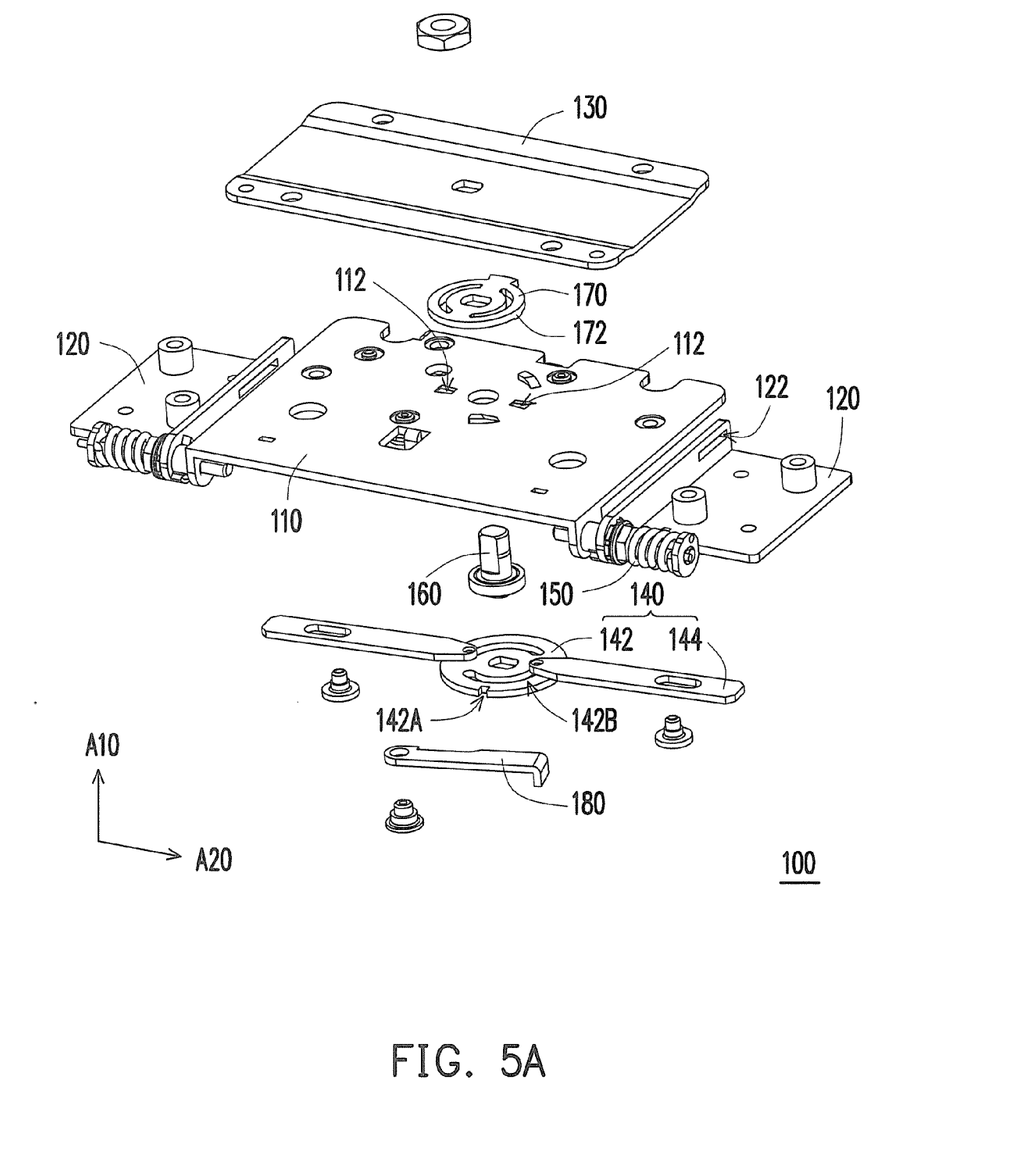
FIG. 5A and FIG. 5B are exploded views of the hinge device of FIG. 1B viewing from two different viewing angles.
Figure 5B:
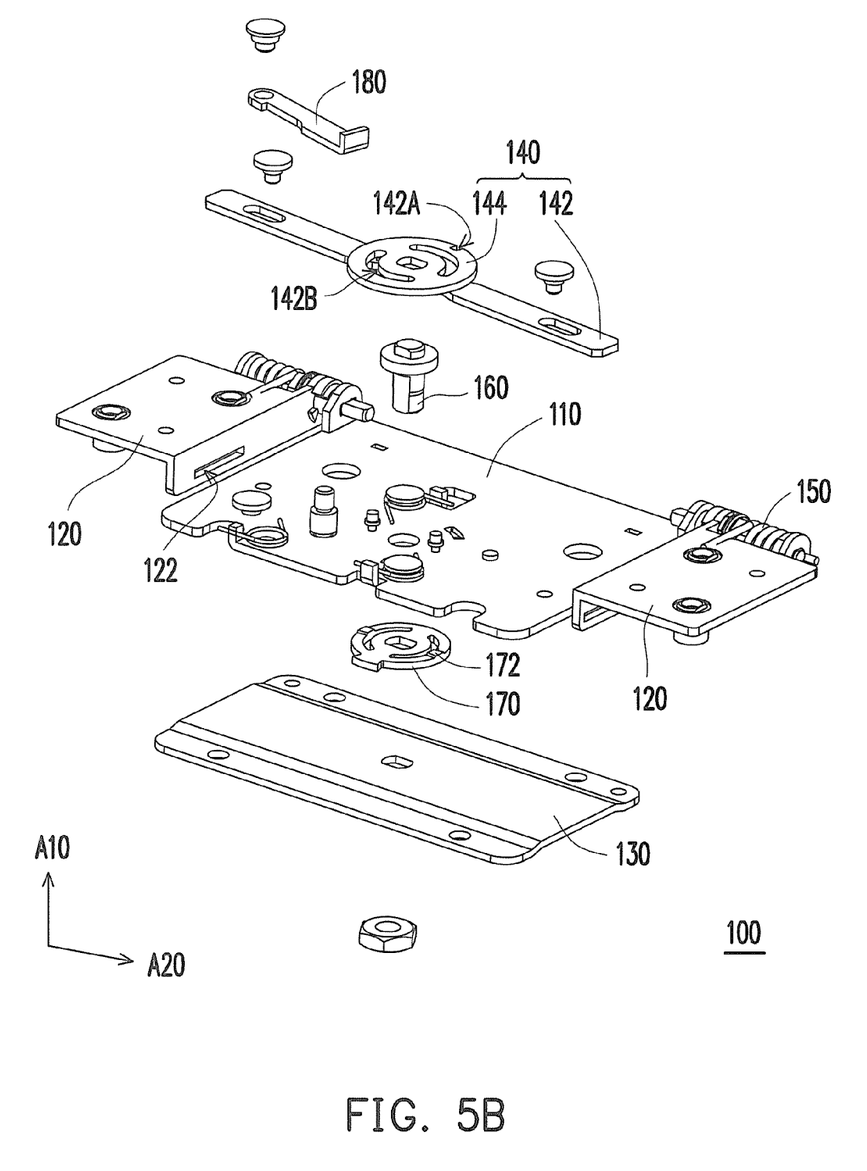

FIG. 5A and FIG. 5B are exploded views of the hinge device of FIG. 1B viewing from two different viewing angles. Referring to FIG. 5A and FIG. 5B, the hinge device 100 further includes a shaft lever 160 and a locating plate 170. The shaft lever 160 sequentially penetrates through the rotating disk 142, the body 110, the locating plate 170 and the rotating part 130. Cross-section shapes of the shaft lever 160 penetrating through the rotating disk 142, the locating plate 170 and the rotating part 130 are matched to the shapes of the corresponding through holes on the rotating disk 142, the locating plate 170 and the rotating part 130 and are not round shapes, so that the shaft lever 160 can drive the rotating disk 142, the locating plate 170 and the rotating part 130 to synchronously rotate. Since a through hole on the body 110 that is penetrated by the shaft lever 160 has a round shape, the body 110 is not rotated along with the shaft lever 160.

The locating plate 170 has at least one locating protrusion 172 at a side adjacent to the body 110. The body 110 has at least one locating slot 112 at a side adjacent to the locating plate 170. The locating protrusion 172 is suitable for engaging the locating slot 112 to limit relative rotation of the rotating part 130 and the body 110. As shown in FIG. 5B, the locating plate 170 is actually a flexible plate by forming two cuttings symmetrically thereon, and two locating protrusions 172 are oppositely formed on the peripheral of the locating plate 170, by which the locating protrusion 172 is capable of selectively engaging with the locating slot 112. Namely, when the locating protrusion 172 is engaged to the locating slot 112 due to the relative position between the rotating part 130 and the body 110, in order to rotate the rotating part 130 relative to the body 110, a suitable force is required to be exerted to separate the locating protrusion 172 from the locating slot 112.

Figure 2C:
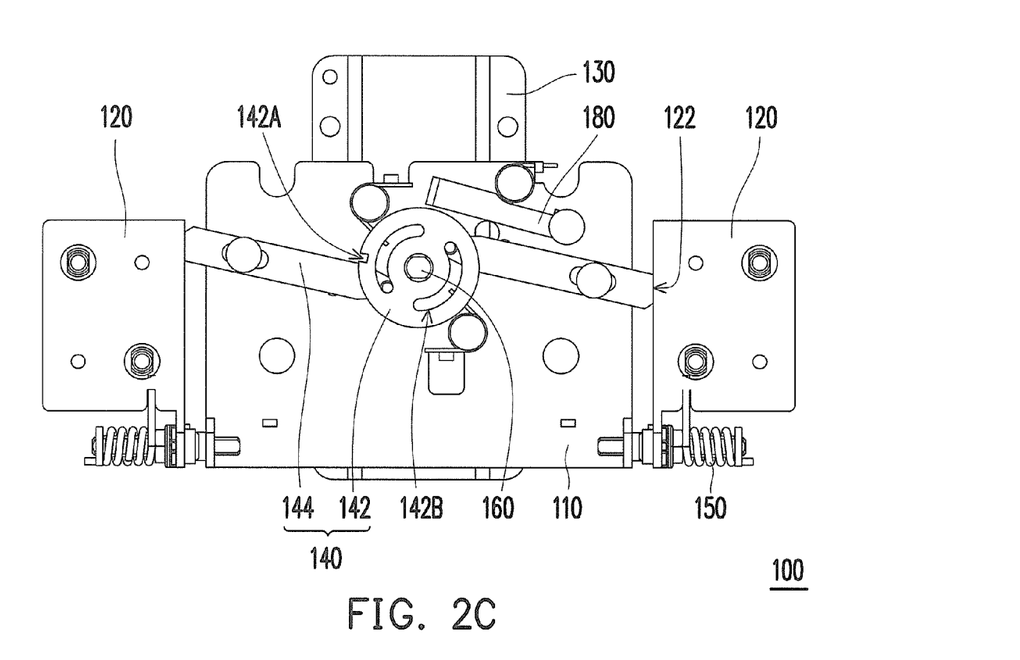
FIG. 2C is a bottom view of the hinge device in the state of FIG. 2A.
Figure 3C:
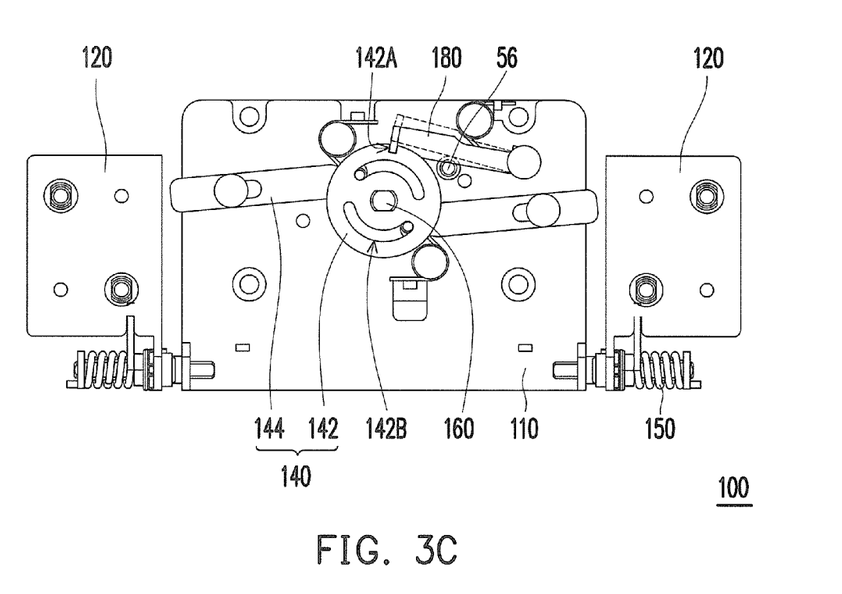
FIG. 3C is a bottom view of the hinge device in the state of FIG. 3A.

Referring to FIG. 3B and FIG. 3C, the hinge device 100 may further include a fixing lever 180. A groove 142A is set on the rotating disk 142. One end of the fixing lever 180 is pivotally connected to the body 110, and another end of the fixing lever 180 is wedged into the groove 142A to limit rotation of the rotating disk 142 when the linkage lever 144 is separated from the first wedging unit 122. Comparatively, when the linkage lever 144 passes through the first wedging unit 122 (shown in FIG. 1C and FIG. 2C), the other end of the fixing lever 180 is not wedged into the groove 142A, and the rotation of the rotating disk 142 is not limited. Therefore, when the linkage lever 144 is separated from the first wedging unit 122 so that the body 110 can rotate relative to the torsion generating part 120, the rotating part 130 and the body 110 cannot rotate relative to each other because of the engagement between the fixing lever 180 and the groove 142A as shown in FIG. 3C. In other word, when the supporting plate 54 is flipped over from the base 52, the supporting plate 54 cannot rotate relative to the body 110, so as to avoid swaying of the portable computer disposed on the supporting plate 54.

Referring to FIG. 3A and FIG. 3C, the keyboard dock 50 further includes a thimble 56 fixed to the base 52. When the supporting plate 54 is rotated relative to the base 52 and is changed from the state of FIG. 4A to the state of FIG. 3A, i.e. the base 52 is parallel to the supporting plate 54, a position of the thimble 56 is as that shown in FIG. 3C, and the fixing lever 180 is propped by the thimble 56 and the other end of the fixing lever 180 is apart from the groove 142A, where the fixing lever 180 of such state is represented by dot lines. Therefore, the supporting plate 54 may again rotate relative to the body 110. In detail, during a process that the hinge device 100 is sequentially changed from the state of FIG. 1A to the states of FIG. 2A and FIG. 3A, the thimble 56 props the fixing lever 180, so that the other end of the fixing lever 180 is apart from the groove 142A, and the supporting plate 54 can rotate relative to the body 110. However, when the supporting plate 54 is flipped over from the base 52, the thimble 56 is separated from the fixing lever 180, and the other end of the fixing lever 180 is wedged into the groove 142A, so that the relative rotation between the rotating part 130 and the body 110 is limited.

Figure 4B:
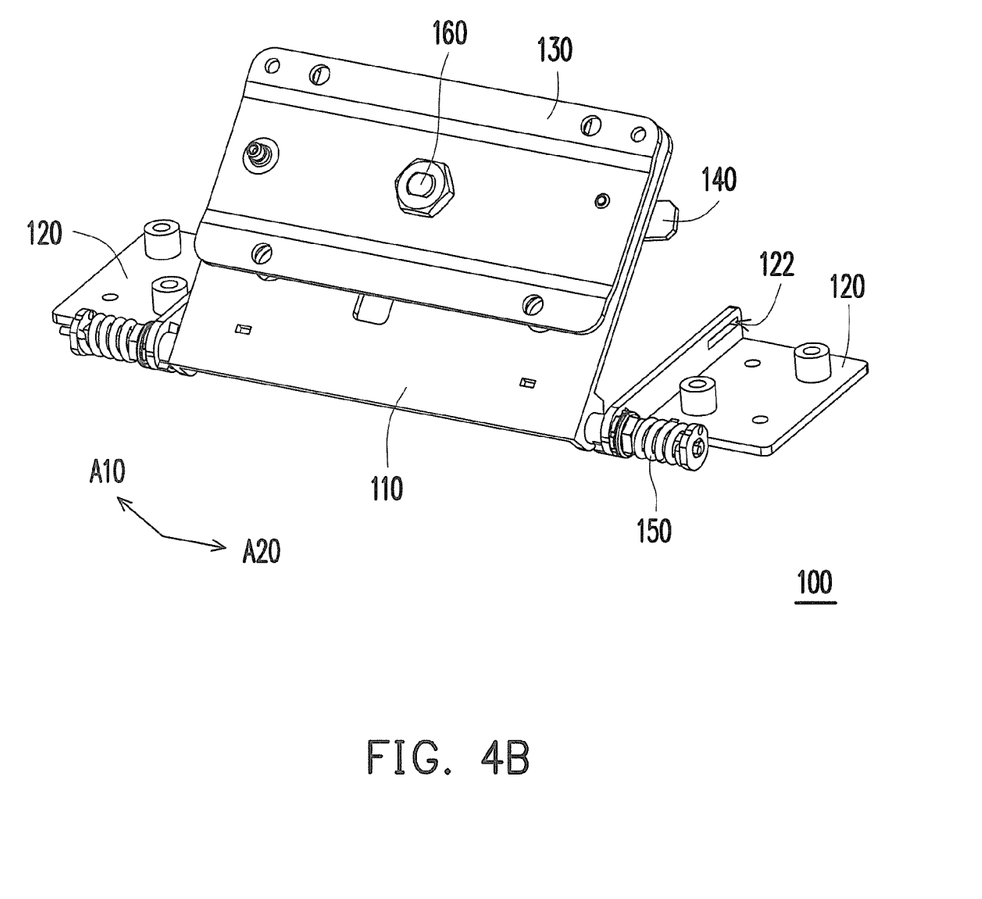
FIG. 4B is a schematic diagram of a hinge device of a keyboard dock in the state of FIG. 4A.

Referring to FIG. 4B, the hinge device 100 further includes a torsion spring 150 disposed between the body 110 and the torsion generating part 120. When the first wedging unit 122 and the second wedging unit 140 are separated from each other, the torsion spring 150 drives the body 110 to rotate relative to the torsion generating part 120. In other words, when the supporting plate 54 is rotated to expose the keyboard module 52A as that shown in FIG. 3A, the torsion spring 150 drives the body 110 to rotate relative to the torsion generating part 120, so that the supporting plate 54 is automatically flipped over from the base 52 and obliquely erected on the base 52 (as that shown in FIG. 4A).

Figure 6:
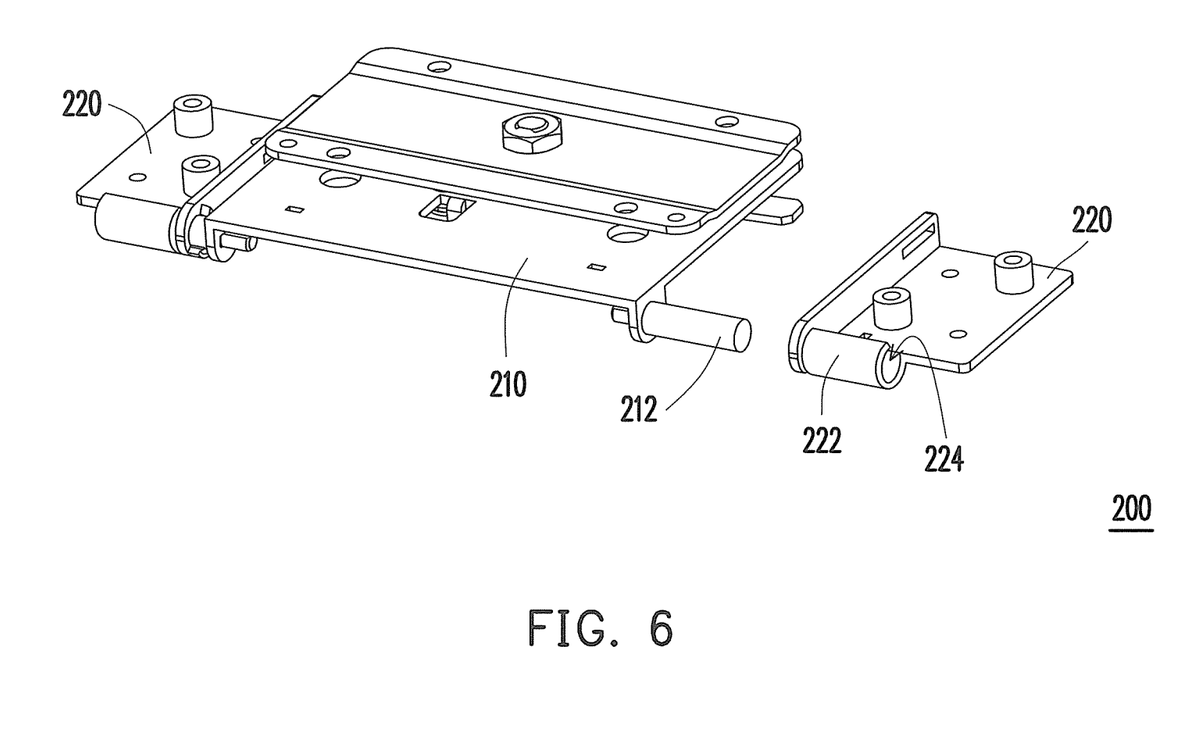
FIG. 6 is a schematic diagram of a hinge device according to another embodiment of the invention.

FIG. 6 is a schematic diagram of a hinge device according to another embodiment of the invention. Referring to FIG. 6, the hinge device 200 of the present embodiment is similar to the hinge device 100 of FIG. 1B, and a difference there between is that a body 210 has a rotation shaft 212. One side of a torsion generating part 220 is curled as a sleeve 222 and forms a gap 224. In other words, an inner diameter of the sleeve 222 can be changed due to influence of an external force, and a size of the gap 224 is accordingly changed. Usually, the inner diameter of the sleeve 222 is smaller than an outer diameter of the rotation shaft 212. Therefore, when the rotation shaft 212 is placed into the sleeve 222, the rotation shaft 212 spreads the gap 224 and is closely inserted into the sleeve 222 and thus generating a desired torque. Due to the friction provided by the close connection between the rotation shaft 212 and the sleeve 222, the rotation shaft 212 can be stably stayed at any angle when rotating relative to the sleeve 222. When the hinge device 200 of the present embodiment is used to replace the hinge device 100 of FIG. 4A, the user can arbitrarily adjust an angle between the base 52 and the supporting plate 54, and the hinge device 200 can provide a force to fix the angle between the base 52 and the supporting plate 54, so that the user can obtain a most suitable angle for viewing the portable computer 60 on the supporting plate 54 according to a personal demand.

Figure 7:
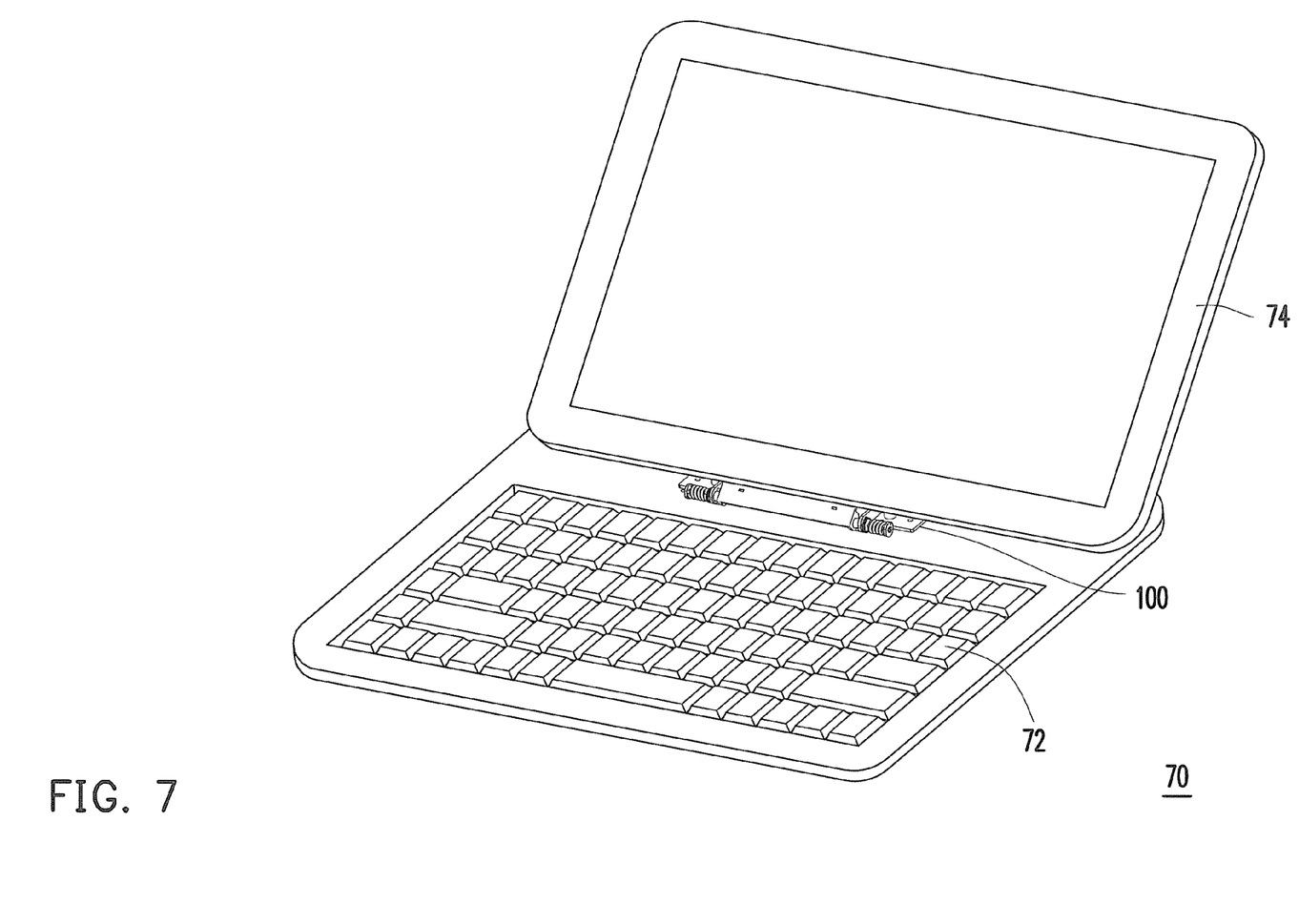
FIG. 7 is a schematic diagram illustrating a portable electronic device according to an embodiment of the invention.

FIG. 7 is a schematic diagram illustrating a portable electronic device according to an embodiment of the invention. Referring to FIG. 7, the portable electronic device 70 includes a host 72, a display unit 74 and the hinge device 100 of FIG. 1B. The display unit 74 is electrically connected to the host 72. The torsion generating part 120 of FIG. 1B is pivotally connected to the body 110 and is fixed to the host 72. The rotating part 130 of FIG. 1B is pivotally connected to the body 110 and is fixed to the display unit 74. When the first wedging unit 122 and the second wedging unit 140 of FIG. 1B are wedged to each other, the host 72 is parallel to the display unit 74. The aforementioned embodiment can be referred for the other details of the hinge device. Certainly, the hinge device 200 of FIG. 6 or the hinge devices of the other embodiments of the invention can also be applied to the portable electronic device 70 of the embodiment.

In summary, in the hinge device, the keyboard dock and the portable electronic device of the invention, the rotating part and the body provide the rotation along the first axis. Moreover, when the wedging units present an unlocking state, the body and the torsion generating part provide the rotation along the second axis. Therefore, the hinge device, the keyboard dock and the portable electronic device of the invention have stable and fluent rotation and opening/closing operations.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A hinge device, comprising:
a body;
a torsion generating part, pivotally connected to the body, and having a first wedging unit;

a rotating part, pivotally connected to the body;
a second wedging unit, assembled to the rotating part and moved along with the rotating part, wherein the first wedging unit and the second wedging unit are wedged to each other or separated from each other when the rotating part rotates relative to the body along a first axis, the body is capable of rotating relative to the torsion generating part along a second axis when the first wedging unit and the second wedging unit are separated from each other, and the first axis is vertical to the second axis, wherein the first wedging unit is a wedging hole, the second wedging unit comprises a rotating disk and at least one linkage lever connected to each other, the rotating disk is assembled to the rotating part and is rotated along with the rotating part, the rotating disk drives the linkage lever to pass through the first wedging unit or separate from the first wedging unit when the rotating part and the rotating disk synchronously rotate relatively to the body; and
a fixing lever, wherein a groove is set on the rotating disk, one end of the fixing lever is pivotally connected to the body, and another end of the fixing lever is wedged into the groove to limit rotation of the rotating disk when the linkage lever is separated from the first wedging unit.

2. The hinge device as claimed in claim 1, further comprising a torsion spring disposed between the body and the torsion generating part, wherein when the first wedging unit and the second wedging unit are separated from each other, the torsion spring drives the body to rotate relative to the torsion generating part.

3. The hinge device as claimed in claim 1, further comprising a shaft lever sequentially penetrating through the rotating disk, the body and the rotating part, wherein the shaft lever drives the rotating disk and the rotating part to synchronously rotate, and the body is not rotated along with the shaft lever.

4. The hinge device as claimed in claim 3, further comprising a locating plate, wherein the shaft lever sequentially penetrates through the rotating disk, the body, the locating plate and the rotating part, the shaft lever drives the rotating disk, the locating plate and the rotating part to synchronously rotate, the locating plate has at least one locating protrusion at a side adjacent to the body, the body has at least one locating slot at a side adjacent to the locating plate, and the locating protrusion is suitable for engaging the locating slot to limit relative rotation of the rotating part and the body.

5. The hinge device as claimed in claim 1, wherein the body has a rotation shaft, one side of the torsion generating part is curled to embrace the rotation shaft to generate a desired torque.

6. A keyboard dock, comprising:
a base, having a keyboard module;
a supporting plate, for supporting a portable computer; and
a hinge device, comprising:
a body;
a torsion generating part, pivotally connected to the body and fixed to the base, and having a first wedging unit;
a rotating part, pivotally connected to the body and fixed to the supporting plate; and
a second wedging unit, assembled to the rotating part and moved along with the rotating part, wherein the first wedging unit and the second wedging unit are wedged to each other or separated from each other when the rotating part rotates relative to the body along a first axis, the base is parallel to the supporting plate when the first wedging unit and the second wedging unit are wedged to each other, and the body is capable of rotating relative to the torsion generating part along a second axis when the first wedging unit and the second wedging unit are separated from each other, and the first axis is vertical to the second axis,
wherein the first wedging unit is a wedging hole, the second wedging unit comprises a rotating disk and at least one linkage lever connected to each other, the rotating disk is assembled to the rotating part and is rotated along with the rotating part, the rotating disk drives the linkage lever to pass through the first wedging unit or separate from the first wedging unit when the rotating part and the rotating disk synchronously rotate relatively to the body,
wherein the hinge device further comprises a fixing lever; and wherein a groove is set on the rotating disk, one end of the fixing lever is pivotally connected to the body, and another end of the fixing lever is wedged into the groove to limit rotation of the rotating disk when the linkage lever is separated from the first wedging unit.

7. The keyboard dock as claimed in claim 6, wherein the hinge device further comprises a torsion spring disposed between the body and the torsion generating part, and when the first wedging unit and the second wedging unit are separated from each other, the torsion spring drives the body to rotate relative to the torsion generating part.

8. The keyboard dock as claimed in claim 6, wherein the hinge device further comprises a shaft lever sequentially penetrating through the rotating disk, the body and the rotating part, wherein the shaft lever drives the rotating disk and the rotating part to synchronously rotate, and the body is not rotated along with the shaft lever.

9. The keyboard dock as claimed in claim 8, wherein the hinge device further comprises a locating plate, wherein the shaft lever sequentially penetrates through the rotating disk, the body, the locating plate and the rotating part, the shaft lever drives the rotating disk, the locating plate and the rotating part to synchronously rotate, the locating plate has at least one locating protrusion at a side adjacent to the body, the body has at least one locating slot at a side adjacent to the locating plate, and the locating protrusion is suitable for engaging the locating slot to limit relative rotation of the rotating part and the body.

10. The keyboard dock as claimed in claim 6, further comprising a thimble fixed to the base, wherein when the base is parallel to the supporting plate, the thimble props the fixing lever and the other end of the fixing lever is apart from the groove, and when the thimble is separated from the fixing lever, the other end of the fixing lever is wedged into the groove.

11. The keyboard dock as claimed in claim 6, wherein the body has a rotation shaft, one side of the torsion generating part is curled to embrace the rotation shaft to generate a desired torque.

12. The keyboard dock as claimed in claim 6, further comprising a pin set disposed aside the keyboard module of the base and electrically connected to the keyboard module, wherein when the supporting plate is obliquely erected on the base and exposes the keyboard module, the pin set is used to electrically connect the portable computer on the supporting plate.

13. A portable electronic device, comprising:
a host;
a display unit, electrically connected to the host; and
a hinge device, comprising:
a body;
a torsion generating part, pivotally connected to the body and fixed to the host, and having a first wedging unit;
a rotating part, pivotally connected to the body and fixed to the display unit; and a second wedging unit, assembled to the rotating part and moved along with the rotating part, wherein the first wedging unit and the second wedging unit are wedged to each other or separated from each other when the rotating part rotates relative to the body along a first axis, the host is parallel to the display unit when the first wedging unit and the second wedging unit are wedged to each other, and the body is capable of rotating relative to the torsion generating part along a second axis when the first wedging unit and the second wedging unit are separated from each other, and the first axis is vertical to the second axis, wherein the first wedging unit is a wedging hole, the second wedging unit comprises a rotating disk and at least one linkage lever connected to each other, the rotating disk is assembled to the rotating part and is rotated along with the rotating part, the rotating disk drives the linkage lever to pass through the first wedging unit or separate from the first wedging unit when the rotating part and the rotating disk synchronously rotate relatively to the body, wherein the hinge device further comprises a fixing lever, wherein a groove is set on the rotating disk, one end of the fixing lever is pivotally connected to the body, and another end of the fixing lever is wedged into the groove to limit rotation of the rotating disk when the linkage lever is separated from the first wedging unit.

14. The portable electronic device as claimed in claim 13, wherein the hinge device further comprises a torsion spring disposed between the body and the torsion generating part, and when the first wedging unit and the second wedging unit are separated from each other, the torsion spring drives the body to rotate relative to the torsion generating part.

15. The portable electronic device as claimed in claim 13, wherein the hinge device further comprises a shaft lever sequentially penetrating through the rotating disk, the body and the rotating part, wherein the shaft lever drives the rotating disk and the rotating part to synchronously rotate, and the body is not rotated along with the shaft lever.

16. The portable electronic device as claimed in claim 15, wherein the hinge device further comprises a locating plate, wherein the shaft lever sequentially penetrates through the rotating disk, the body, the locating plate and the rotating part, the shaft lever drives the rotating disk, the locating plate and the rotating part to synchronously rotate, the locating plate has at least one locating protrusion at a side adjacent to the body, the body has at least one locating slot at a side adjacent to the locating plate, and the locating protrusion is suitable for engaging the locating slot to limit relative rotation of the rotating part and the body.

17. The portable electronic device as claimed in claim 13, further comprising a thimble fixed to the host, wherein when the host is parallel to the display unit, the thimble props the fixing lever and the other end of the fixing lever is apart from the groove, and when the thimble is separated from the fixing lever, the other end of the fixing lever is wedged into the groove.

18. The portable electronic device as claimed in claim 13, wherein the body has a rotation shaft, one side of the torsion generating part is curled to embrace the rotation shaft to generate a desired torque.

* * * * *